United States Patent [19]

Davis et al.

[11] Patent Number: 4,919,543

[45] Date of Patent: Apr. 24, 1990

[54] MOLTEN METAL TEMPERATURE PROBE

[75] Inventors: Dennis W. Davis, Lawrence County, Tenn.; Ray D. Peterson, Florence; Walter Posey, Jr., Lauderdale County, both of Ala.

[73] Assignee: Reynolds Metals Company, Richmond, Va.

[21] Appl. No.: 208,612

[22] Filed: Jun. 20, 1988

[51] Int. Cl.⁵ ............................................. G01K 13/00
[52] U.S. Cl. ................................... 374/139; 374/137; 374/140; 136/234
[58] Field of Search .................. 136/230, 232-234; 266/99; 374/26, 110, 136, 137, 139, 140, 166, 179-182, 208

[56] References Cited

U.S. PATENT DOCUMENTS

| | | | |
|---|---|---|---|
| 2,094,102 | 9/1937 | Filterer | 136/228 |
| 2,660,061 | 11/1953 | Lewis | 136/234 |
| 2,757,220 | 7/1956 | Carter | 136/233 |
| 2,878,355 | 3/1959 | McDonald | 338/28 |
| 3,279,252 | 10/1966 | Barlow | 73/295 |
| 3,334,520 | 8/1967 | Putman | 136/234 |
| 3,539,400 | 11/1970 | Pustell | 136/233 |
| 3,653,262 | 4/1972 | Ehrenfried et al. | 73/292 |
| 3,688,295 | 8/1972 | Tsoras et al. | 340/227 R |
| 3,716,417 | 2/1973 | Evans | 136/232 |
| 3,797,310 | 3/1974 | Babcock et al. | 73/295 |
| 3,923,552 | 12/1975 | Parris | 136/234 |
| 4,157,039 | 6/1979 | Kilmister et al. | 374/137 |
| 4,175,438 | 11/1979 | Wenzl et al. | 136/224 |
| 4,176,554 | 12/1979 | Kazmierowicz | 73/61.2 |
| 4,324,138 | 4/1982 | Davis et al. | 374/111 |
| 4,412,090 | 10/1983 | Kawate et al. | 136/230 |
| 4,440,509 | 4/1984 | Agarwal | 374/166 |
| 4,653,935 | 3/1987 | Daily et al. | 374/208 |
| 4,733,975 | 3/1988 | Komanetsky et al. | 374/144 |

FOREIGN PATENT DOCUMENTS

| | | | |
|---|---|---|---|
| 2605365 | 9/1976 | Fed. Rep. of Germany | 374/140 |
| 1272112 | 8/1961 | France | 374/179 |

Primary Examiner—William A. Cuchlinski, Jr.
Assistant Examiner—W. Morris Worth

[57] ABSTRACT

A probe for measuring the temperatures within a molten metal pool at various vertical levels within the pool is disclosed. The probe includes a plurality of vertically spaced thermocouples protruding from the surface of a refractory block. Also disclosed is a support mechanism for positioning and maintaining the temperature probe within the molten metal pool.

10 Claims, 1 Drawing Sheet

MOLTEN METAL TEMPERATURE PROBE

BACKGROUND OF THE INVENTION

Numerous metallic materials are melted and held in various type furnaces. An example of such a procedure is the holding of molten aluminum in a reverberatory furnace. The depth of molten metal in such furnaces may range considerably. Again using the example of the molten aluminum reverberatory furnace, the molten aluminum pool may range from about 10 to 40 inches.

To either melt or maintain the metal in a molten state, heat is transferred from the burner flame to the molten metal by convection and radiation. Such heat transfer implies that the furnace atmosphere at the upper metal surface will be hotter than the underlying levels of molten metal. Some furnaces employ pumps or other means for stirring the molten metal to prevent this thermal stratification and increase the rate of heat transfer within the furnace. To evaluate the severity of thermal stratification or measure the effectiveness of pumping or stirring, it is necessary to have a mechanism for measuring the metal temperature through a vertical section of the molten metal pool. It is highly preferred that these measurements taken substantially simultaneously, since the temperatures within a molten metal pool can change fairly rapidly, especially if pumping is employed.

Previous techniques for measuring the temperature gradient in molten metals fall into several general categories. First, a single sheaved thermocouple was employed to measure individual points in the metal pool. This technique suffers from slow response time and the fact that metal temperatures as a whole are changing in the pool as time proceeds. Thus, a vertical thermal profile may be adversely affected by large furnace changes.

Bundles of sheaved thermocouples might be used to measure several points simultaneously. However, this system still has a response time that is relatively slow. Further, sheaved thermocouples have relatively short life spans, especially as metal temperature and metal movement increases, resulting in a relatively high cost per measurement system.

Another proposed mechanism for measuring the temperature at varying vertical levels within the molten metal pool is to place a number of thermocouples inside a protective metal cylinder. The cylinder guards against attack of the thermocouples, increasing their life. However, the conduction of heat along the cylinder may be greater than the difference in metal temperature at the varying levels within the pool. This effect masks the temperature gradient and thereby makes its use unsuccessful.

There remains, therefore, a need for a mechanism for measurement of the temperature gradient along the vertical section of a molten metal pool which has acceptably fast response time and relatively low cost.

THE PRESENT INVENTION

By means of the present invention, these desired goals have been obtained. The temperature probe of the present invention comprises a series of thermocouple wires embedded within a refractory shell, with the measurement ends of the thermocouple wires being exposed from the surface of the refractory shell at vertically spaced points along the refractory surface. The refractory protects the thermocouple wire from damage by the molten metal and thermally isolates the thermocouples from one another. The exposed thermocouple junctions provide fast response time. Further, when a thermocouple junction wears out, the surface of the refractory may be partially removed to expose a new portion of the thermocouple junction.

A support mechanism for the probe is also provided. This support mechanism is gas cooled, such as being air cooled, to extend its life within the furnace.

BRIEF DESCRIPTION OF THE DRAWINGS

The temperature probe of the present invention will be more fully described with reference to the Figures in which.

DETAILED DESCRIPTION OF THE PREFERRED EMBODIMENTS

Figure 1:
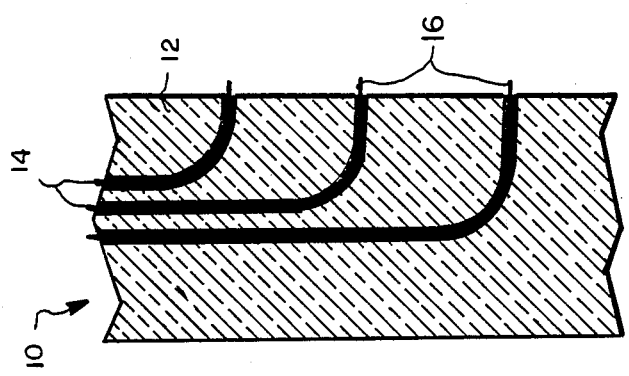
FIG. 1 is a partial cross-sectional view of the temperature probe of the present invention.

Turning now to the Figures, FIG. 1 illustrates in partial cross section the temperature probe 10 of the present invention. The probe 10 comprises a body 12 of refractory material. The refractory material 12 may be any of the refractories well-known to those skilled in the art to withstand the rigors of the molten metal environment, including temperature, thermal shock and dissolution from the metal bath. A typical material for this refractory body is fused silica. The refractory body 12 may be of any desired shape, but, for ease of formation, is preferably in the form of a cylinder. Its length is chosen to relate to the depth of the metal bath to be studied.

Embedded within the refractory body 12 are a plurality of thermocouple wires 14. These wires 14 are cast in place as the refractory body 12 is formed. Optionally, the wires 14 may be further protected by stringing ceramic beads over the wires 14 prior to casting. The wires 14 have their ends 16 thereof exposed at the surface of the refractory body 12 at vertically spaced positions along the surface of the refractory body 12. The exposed thermocouple junctions 16 provide the measurement points along the probe 10. The thermocouple wires pair 14 can be any of the typically employed thermocouple wire materials, such as Chromel/Alumel wire and the like.

As the temperature probe 10 is used, one or more of the thermocouple junctions 16 will eventually wear out. When this occurs, the surface of the refractory body 12 may be chipped away at the junction point or, the entire refractory body 10 may be resurfaced, such as by a lathe operation or the like, to reexpose new portions of wire pair 14 which is then formed into new thermocouple junctions 16. There is no need for actual reduction of the surface of the refractory probe 10 other than at the points where new thermocouple junctions 16 are required.

In operation, the refractory body 12 acts as an insulator, eliminating false readings by probe or body conduction between the individual thermocouples, as well as protecting the thermocouple wires 14 from exposure.

Figure 2:
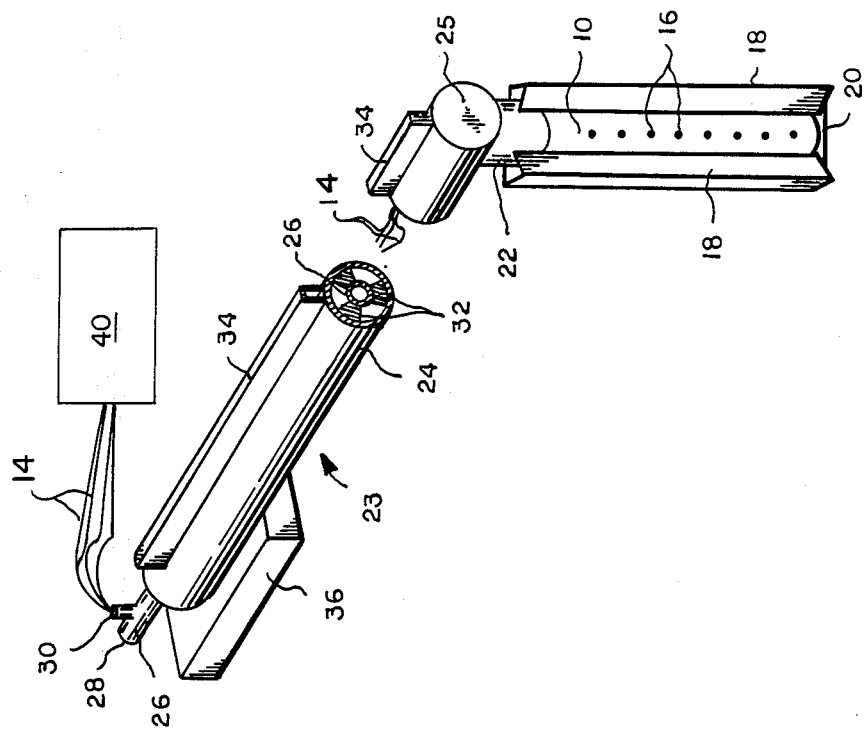
FIG. 2 is an isometric view, partially broken, illustrating the temperature probe and its support structure.

FIG. 2 illustrates the temperature probe 10 and an associated apparatus for positioning and maintaining the probe 10 in a molten metal furnace.

The probe 10 must be lowered into a bath of molten metal, and, at times, must pass through a solid crust of slag or the like above the molten metal. To prevent damage to the refractory probe 10, the probe 10 is fitted with metal section members 18 and 20 along its side and bottom. These metal protectors 18 and 20 may be, for example, iron or steel hollow channel sections, which reduces their weight while providing the reinforcement strength required.

A metal pipe 22 is cast into the temperature probe 10 as it is formed. This pipe 22 may be threaded to screw into support boom 23 or may be welded to support boom 23. Support boom 23 comprises a metal pipe 24. In order that the support boom 23 may withstand the temperatures within the furnace, the pipe 24 is provided with a stiffener 34, which may again be in the form of a hollow metal channel or may be a solid metal bar. Further, the pipe 24 is air cooled. A smaller diameter pipe 26 is held within pipe 24 by means of spacers 32. The pipe 26 does not extend to the end of pipe 24 which is closed by end cap 25, permitting air entering pipe 26 through inlet 28 to circulate within pipe 24 and exit from within the air spaces between pipe 24 and pipe 26.

The thermocouple wires 14 which have their exposed thermocouple surfaces 16 on the outer surface of probe 10 pass through connecting pipe 22 and are passed within inner cooling pipe 26, so that these wires 14 are cooled by the air passing within pipe 26. They exit from a T opening 30 from pipe 26 and are connected to a data recorder or other device 40 for measuring the output of the thermocouple junctions 16.

The support boom 23 is mounted, such as by welding, to a generally rectangular shoe 36. The shoe 36 is open at its end adjacent air inlet 28 to permit the fork of a forklift truck to enter shoe 36 and position the boom 23 and probe 10 within the furnace to be measured.

From the foregoing, it is clear that the present invention provides a simple, yet reliable means for measuring temperatures at varying vertical locations within a molten metal pool substantially simultaneously. While the invention has been described with reference to certain specific embodiments thereof, it is not intended to be so limited, except as set forth in the accompanying claims.

We claim:

1. A temperature probe for use in molten metal comprising a refractory body, said refractory body having a surface along its length, a plurality of thermocouple wire pairs cast in place within said refractory body as said refractory body is formed, said wire pairs having their first ends protruding from the surface of said refractory body and formed into thermocouple junctions at varying points along the length of said probe and outside of the surface of said probe, said junctions being in direct contact with said molten metal during use to thereby provide a plurality of temperature measurement points along the length of said probe, said wire pairs having their other ends protruding from said refractory body thereby providing a plurality of temperature inputs to a temperature measuring means, and boom means for positioning said probe comprising a pipe embedded in said refractory body, a support pipe to which said pipe is connected and a positioning means.

2. The probe of claim 1 wherein said refractory body is formed from fused silica.

3. The probe of claim 1 wherein said thermocouple wire pairs are Chromel/Alumel wire pairs.

4. The probe of claim 1 wherein said refractory body includes metal protectors along a portion of its side and bottom, said protectors not covering said thermocouple junctions such that said thermocouple junctions are in direct contact with said molten metal.

5. The probe of claim 4 wherein said metal protectors are hollow channel sections.

6. The probe of claim 1 wherein said support pipe is air cooled.

7. The probe of claim 6 wherein said support pipe is closed at one end and an inner pipe and spacers are fitted within said support pipe, said inner pipe supplying air for cooling.

8. The probe of claim 1 wherein said support pipe is reinforced with a metal support member.

9. The probe of claim 8 wherein said metal support member comprises a hollow channel.

10. The probe of claim 1 wherein said positioning means comprises a shoe constructed and arranged to permit a fork lift truck fork to enter said shoe and to support and position said probe.

* * * * *